United States Patent Office 3,008,979
Patented Nov. 14, 1961

3,008,979
DIVINYL d-CAMPHORATE
Elmar K. Wilip, Cambridge, Mass., assignor to W. R. Grace & Co., Cambridge, Mass., a corporation of Connecticut
No Drawing. Filed Nov. 13, 1959, Ser. No. 852,616
1 Claim. (Cl. 260—468)

This invention is directed to divinyl d-camphorate having the structure

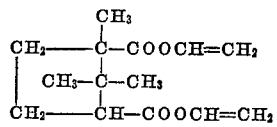

This new compound is a liquid which boils at 148–150° C. (15 mm.) It has been found to be useful as a cross-linking agent in the formation of useful polymeric materials.

The compound of this invention is conveniently made by the so-called "vinyl interchange" reaction, in which vinyl esters may be prepared by reacting vinyl acetate with the desired carboxylic acid in the presence of a catalyst, usually a mercuric salt.

In the preferred method of preparing the new compound of this invention, d-camphoric acid is reacted with a large excess of vinyl acetate in the presence of mercuric sulfate. The reaction is allowed to proceed at room temperature and at normal atmospheric pressure until equilibrium is reached. About 85% of the acid is converted to its vinyl ester.

The following example depicts a representative preparation of the new compound of this invention.

*Example I*

To 2064 g. (about 24 moles) of vinyl acetate there were added 0.2 g. copper resinate (polymerization inhibitor) and 2.0 g. mercuric acetate, and the mixture was cooled to 0° C. An amount of concentrated sulfuric acid (0.6 ml.) approximately equivalent to the mercuric acetate was slowly stirred into the mixture, followed by the addition of 200 g. (about 1 mole) of d-camphoric acid. The mixture was allowed to stand for 14 days at room temperature. When a sample of the reaction mixture was analyzed for divinyl d-camphorate and d-camphoric acid, 85% of the acid was found to have been converted to its vinyl ester. The sulfuric acid was then neutralized with 5.0 g. of sodium acetate trihydrate dissolved in 10 ml. of water, after which the excess of vinyl acetate together with the acetic acid formed during the reaction were removed by flash distillation. Unreacted d-camphoric acid remaining in the reaction mixture was neutralized by washing with a 0.1 N sodium hydroxide solution until the wash remained alkaline. The divinyl d-camphorate was extracted with ether and was further purified by high vacuum distillation.

The divinyl d-camphorate was used as a cross-linking agent for vinyl acetate in the manner shown in the following example.

*Example II*

A mixture of 10 grams of vinyl acetate, 5 grams of divinyl d-camphorate and 0.5 gram of benzoyl peroxide was heated over a steam bath for a period of one-half hour. The resulting polymer was hard gel-like and absolutely insoluble in any of the conventional solvents, indicating a high degree of cross-linking.

This application is a continuation-in-part of copending application Serial No. 783,664, filed December 30, 1958, now abandoned.

I claim:
Divinyl d-camphorate.

References Cited in the file of this patent
UNITED STATES PATENTS
2,310,780     Hanford et al. _____ Feb. 9, 1943

OTHER REFERENCES
Carson et al.: Chem. Abst. 44, 791 (1950).